US008559386B2

(12) United States Patent
Kuroda

(10) Patent No.: US 8,559,386 B2
(45) Date of Patent: *Oct. 15, 2013

(54) WIRELESS COMMUNICATIONS SYSTEM, WIRELESS COMMUNICATIONS APPARATUS, WIRELESS COMMUNICATIONS METHOD AND COMPUTER PROGRAM FOR WIRELESS COMMUNICATION

(75) Inventor: Shinichi Kuroda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/548,476

(22) Filed: Jul. 13, 2012

(65) Prior Publication Data
US 2012/0281661 A1 Nov. 8, 2012

Related U.S. Application Data

(63) Continuation of application No. 12/261,708, filed on Oct. 30, 2008, now Pat. No. 8,249,002, which is a continuation of application No. 10/922,911, filed on Aug. 23, 2004, now Pat. No. 7,474,641.

(30) Foreign Application Priority Data

Nov. 5, 2003 (JP) ................................ 2003-375503

(51) Int. Cl.
*H04W 4/00* (2009.01)
*H04M 1/00* (2006.01)
(52) U.S. Cl.
USPC .......................... 370/329; 370/334; 455/562.1

(58) Field of Classification Search
USPC ................................ 370/329, 334; 455/562.1
See application file for complete search history.

(56) References Cited

U.S. PATENT DOCUMENTS

| 7,194,237 | B2 | 3/2007 | Sugar et al. | |
|---|---|---|---|---|
| 2003/0026349 | A1* | 2/2003 | Onggosanusi et al. | 375/267 |
| 2003/0130003 | A1* | 7/2003 | Won | 455/522 |
| 2003/0181170 | A1 | 9/2003 | Sim | |
| 2004/0192218 | A1* | 9/2004 | Oprea | 455/73 |
| 2004/0234004 | A1 | 11/2004 | Ketchum et al. | |
| 2005/0014474 | A1* | 1/2005 | Jitsukawa et al. | 455/101 |
| 2005/0141448 | A1 | 6/2005 | Bolinth et al. | |
| 2009/0103590 | A1* | 4/2009 | Dabak et al. | 375/130 |

FOREIGN PATENT DOCUMENTS

JP 2005-521327 7/2005
WO WO 03/081803 A1 10/2003

* cited by examiner

*Primary Examiner* — Barry Taylor
(74) *Attorney, Agent, or Firm* — Oblon, Spivak, McClelland, Maier & Neustadt, L.L.P.

(57) ABSTRACT

In performing SVD-MIMO transmission, a set-up procedure is simplified while assuring a satisfactory decoding capability with a reduced number of antennas. A transmitter estimates channel information based on reference signals sent from a receiver, determines a transmit antenna weighting coefficient matrix based on the channel information, calculates a weight to be assigned to each of components of a multiplexed signal, and sends, to the receiver, training signals for respective signal components, the training signals being weighted by the calculated weights. On the other hand, the receiver determines a receive antenna weighting coefficient matrix based on the received training signals.

10 Claims, 8 Drawing Sheets

RELATED ART

WIRELESS COMMUNICATIONS SYSTEM, WIRELESS COMMUNICATIONS APPARATUS, WIRELESS COMMUNICATIONS METHOD AND COMPUTER PROGRAM FOR WIRELESS COMMUNICATION

CROSS-REFERENCE TO RELATED APPLICATIONS

This application is a continuation of and claims the benefit or priority under 35 U.S.C. §120 for U.S. Ser. No. 12/261,708, filed Oct. 30, 2008, which is a continuation of Ser. No. 10/922,911, filed Aug. 23, 2004, and claims the benefit of priority under 35 U.S.C. §119 from Japanese Patent Application No. 2003-375503, filed Nov. 5, 2003, the entire contents of each which are incorporated herein by reference.

BACKGROUND OF THE INVENTION

1. Field of the Invention

The present invention relates to a system, apparatus, method and computer program for a wireless communication among a plurality of wireless stations, such as a communication by a wireless LAN (Local Area Network). In particular, the invention relates to such a system, apparatus, method and computer program which realize a broadband wireless transmission in home or other similar communication environments.

More specifically, this invention relates to a system, apparatus, method and computer program which enhance the transmission capacity by employing a communication where a transmitter and a receiver each having a plurality of antennas communicate with each other using space division multiplexing, that is, MIMO communication; in particular, the invention relates to such a system, apparatus, method and computer program, which are adapted to perform MIMO transmission using a singular value decomposition (SVD) of a channel information matrix each element in which represents propagation information of one of sub-channels each linking a pair of an antenna of the transmitter and an antenna of the receiver.

2. Description of Related Art

Computer networking such as LAN efficiently enables to share information and apparatus resources. Wireless LAN is attracting attention of people as a system for relieving users from the conventional wired LAN construction. In a working space such as an office, most of cables and wires can be dispensed with by employing a wireless LAN, facilitating relocation of a communication terminal such as a personal computer. Recently, demand for wireless LAN has increased with the speed improvement and price-reduction of wireless LAN. In particular, to establish a small wireless network of a plurality of electronic devices present around people so as to enable communications thereamong, introduction of Personal Area Network (PAN) is considered. For instance, there are defined various wireless communication systems and apparatuses using respective frequency bands, e.g. 2.4 GHz and 5 GHz bands, which are permitted for use without a license from the supervisory authority.

One of the standards related to wireless networking is IEEE (the Institute of Electrical and Electronics Engineers) 802.11 (see nonpatent literature 1). IEEE 802.11 standard is further divided, depending upon the employed methods and used frequencies, into IEEE 802.11a, IEEE 802.11b . . . etc., defining respective wireless communications methods.

IEEE 802.11a standard supports a modulation method achieving a communication speed of up to 54 Mbps. However, there is a demand for a wireless standard capable of realizing a higher bit rate as the communication speed. In this situation, MIMO (Multi-Input Multi-Output) communication technology has recently attracted increased attention. This technology is for enhancing the communication speed by providing both of the transmitter and receiver with a plurality of antennas, so as to realize space division multiplexing, i.e., a plurality of sub-channels which are logically independent of one another, to increase the transmission capacity. Using the space division multiplexing, MIMO is bandwidth-efficient.

FIG. 5 schematically shows a MIMO communications system, where each of a transmitter and a receiver is equipped with a plurality of antennas. The transmitter space-time encodes N data for transmission to be multiplexed, and distributes the encoded data to M antennas of the transmitter from which the data are sent over a channel to the receiver in a multiplexed fashion. The receiver receives and space-time decodes the data received through N antennas thereof via the channel, to obtain received data. Thus, a MIMO communication is not the same as a communication by a simple transmission/reception adaptive array. In MIMO, the channel model involves an RF environment (transfer function) on the side of the transmitter, a construction (transfer function) of the channel space, and an RF environment (transfer function) on the side of the receiver. When a signal is transmitted from antennas in a multiplexed fashion, crosstalk occurs; by signal processing performed on the part of the receiver, the multiplexed signal is retrieved correctly.

A MIMO system is a communications system utilizing a characteristic of the channel. In the system, the transmitter sends out the transmitted data or signal by distributing components of the data to the plural antennas thereof (hereinafter referred to as "transmit antennas"), and the receiver obtains received data by processing the signal components received through the plural antennas thereof (hereinafter referred to as "receive antennas"). Although various applications of the MIMO transmission technology are known, one of ideal modes of MIMO is that using SVD (Singular Value Decomposition) of a propagation function, namely, SVD-MIMO system, as disclosed in Patent Document 2 and nonpatent literature 2, for instance.

FIG. 6 schematically shows a SVD-MIMO transmission system, where a matrix of numbers, i.e., a channel information matrix H, each of whose elements represents information on each of sub-channels linking respective antenna pairs, is subjected to a singular value decomposition to obtain $UDV^H$, and an antenna weighting coefficient matrix V on the part of the transmitter (hereinafter referred to as "transmit antenna weighting coefficient matrix V") and an antenna weighting coefficient matrix $U^H$ on the part of the receiver (hereinafter referred to as "receive antenna weighting coefficient matrix $U^H$") are provided. Accordingly, the channel information is expressed by a diagonal matrix whose diagonal elements are square roots of respective eigenvalues $\lambda_i$. Thus, a signal can be transmitted in a multiplexed fashion without suffering from crosstalk at all. However, in the SVD-MIMO transmission system, it is not easy to perform the operation of the SVD in real time, and the set-up procedure such that the derived V or $U^H$ is beforehand communicated to the other part of the communication is essential.

It is possible to achieve the theoretically maximum communication capacity by the SVD-MIMO transmission system. For instance, where the transmitter and receiver respectively have two antennas, a transmission capacity of two times large at maximum can be achieved.

There will now be described the scheme of the SVD-MIMO transmission system. Where the numbers of antennas of the transmitter and receiver are M and N, respectively, transmitted signal x is represented as vector (M×1) while the received signal y is represented by vector (N×1). In this case, the channel information can be represented as a matrix H of N×M. An entry $h_{ij}$ of the channel information matrix H represents a transfer function with respect to a sub-channel from a j-th transmit antenna to an i-th receive antenna. A vector y representing the received signal equals to a multiplication of the matrix H by the vector of the transmitted signal, plus a noise vector n, and is expressed by the following equation (1):

$$y = Hx + n \tag{1}$$

The channel information matrix H subjected to the singular value decomposition as described above, is expressed by the following equation (2):

$$H = UDV^H \tag{2}$$

In equation (2), the transmit antenna weighting coefficient matrix V and receive antenna weighting coefficient matrix U are unitary matrices which respectively satisfy the following equations (3) and (4):

$$U^H U = I \tag{3}$$

$$V^H V = I \tag{4}$$

That is, the receive antenna weighting coefficient matrix $U^H$ is an array of normalized eigenvectors of $HH^H$, while the transmit antenna weighting coefficient matrix V is an array of normalized eigenvectors of $H^H H$. Further, D represents a diagonal matrix whose diagonal elements are square roots of respective eigenvalues of $H^H H$ or $HH^H$. The size of the matrix D corresponds to the smaller one of the numbers M and N of the transmit antennas and receive antennas, that is, the matrix D is a square diagonal matrix having a rank of min (M, N).

$$D = \begin{bmatrix} \sqrt{\lambda_1} & \cdots & & 0 \\ \vdots & \sqrt{\lambda_2} & & \\ & & \ddots & \\ 0 & & & \sqrt{\lambda_{min(M,N)}} \end{bmatrix} \tag{5}$$

In the above description related to the singular value decomposition, a case where only real numbers are involved is assumed. It is noted that in the case where imaginary numbers are also involved, even where eigenvectors of the matrices U and V, each of which is a matrix of eigenvectors, are manipulated so that the norm of each matrix is 1, that is, normalized, an infinite number of eigenvectors having respective phases, not a single eigenvector, exist. In some cases, the equation (2) can not be established depending upon the phase difference between U and V, namely, where U and V are correct but have different phases. To completely synchronize the phases, V is obtained as a matrix of eigenvectors of $H^H H$ as ordinary, while U is obtained by multiplying both terms of the equation (2) by V, as expressed by the following equation (6):

$$HV = UDV^H V = UDI = UD \quad U = HVD^{-1} \tag{6}$$

The transmitter weights the components of the signal for respective sub-channels by the transmit antenna weighting coefficient matrix V, while the receiver receives the signal with weighting the components by an inverse weighting coefficient matrix $U^H$; since each of U and V is a unitary matrix (U is represented by N×min(M, N) while V is represented by M×min(M, N)), the following expression is obtained:

$$\begin{aligned} y &= U^H HVx + U^H n \\ &= U^H (UDV^H) Vx + U^H n \\ &= (U^H U) D (V^H V) x + U^H n \\ &= IDIx + U^H n \\ y &= Dx + U^H n \end{aligned} \tag{7}$$

The vectors y and x are not determined by the numbers of the antennas of the transmitter and the receiver, but are respectively expressed by (min(M, N)×1).

Since D is a diagonal matrix, each transmitted signal can be received without suffering from the cross talk. The amplitude of each of the sub-channels which are independent from one another is proportional to the square root of the eigenvalue λ, and thus the power of each sub-channel is proportional to λ.

As to the noise component n, since the columns of U are the eigenvectors normalized so that the norm is 1, $U^H n$ does not affect the noise power of the received signal. $U^H n$ is a vector whose size is min (M, N), which is the same size as y and x.

As described above, in the SVD-MIMO transmission, plural independent logical sub-channels free from crosstalk even occupying the same frequency band and the same time period can be obtained. This means that it is enabled to simultaneously transmit plural data using a same frequency band, improving the transmission speed.

[Patent Document 1] JP-A-10-84324
[Patent Document 2] U.S. Pat. No. 6,058,105
[Nonpatent Literature 1] International Standard ISO/IEC 8802-11:1999 (E) ANSI/IEEE Std 802.11, 1999 Edition, Part 11: Wireless LAN Medium Access Control (MAC) and Physical Layer (PHY) Specifications
[Nonpatent Literature 2] http://radio3.ee.uec.ac.jp/MIMO (IEICE_TS).pdf (as of Oct. 24, 2003)

In the SVD-MIMO system, the receiver must obtain the channel information matrix H, implement the singular value decomposition, and communicate $V^H$ as a factor of $UDV^H$ obtained as the result of the decomposition to the transmitter. In effect, the transmitter uses V and therefore V must be communicated to the transmitter.

An amount of information carried by the transmit antenna coefficient matrix V will be now considered, by taking for example IEEE 802.11a which defines one of LAN systems where the SVD-MIMO transmission is applicable, namely, OFDM (Orthogonal Frequency Division Multiplexing) of 5 GHz band.

Where each of the transmitter and receiver has three antennas, the transmit antenna weighting coefficient matrix V is a 3×3 matrix, having nine elements. In this case, when each element is a complex number represented using 10 bits, and 52 carriers are provided, a total of 9360 bits of information, i.e., 9 (the number of elements of the matrix)×2 (the real and imaginary part of a complex number)×10×52 (the number of OFDM sub-carriers), has to be fed back to the transmitter from the receiver.

The MIMO requiring such feedback is called closed-loop MIMO, while the opposite thereof is open-loop MIMO. A closed-loop SVD-MIMO system must feedback information of that much (9360 bits) to the transmitter, upon initiation of a communication. Let us assume that the information is fed back where the most reliable one in the modulation schemes provided by IEEE 802.11a, i.e., BPSK is employed as a first modulation method, the coding rate is 1/2, and OFDM is employed as a second modulation method. Since 1 OFDM symbol can carry only 24 bits, 390 OFDM symbols are required for the transmission of the information, making the SVD-MIMO unpractical.

As one of embodiments for realizing the above-described set-up processing in the MIMO transmission by a relatively simple mechanism, a technique called V-BLAST is known. V-BLAST is an acronym of "Vertical Bell Laboratories Layered Space Time" and refers to a technology originally developed by the now-defunct AT & T Bell Laboratories. See Patent Documents 1, for instance.

FIG. 7 schematically shows a structure of a V-BLAST communication system. A transmitter space-time encodes N data for transmission to be multiplexed, and distributes the encoded N data to M antennas (in the specific example shown in FIG. 7, two antennas) through which the multiplexed data is transmitted over a channel to a receiver. The receiver space-time decodes data received through N antennas (in the present example, three antennas) via the channel, to obtain N received data.

The difference between the V-BLAST and SVD-MIMO systems is that the transmitter in the V-BLAST does not provide the antenna weighting coefficient matrix V, but simply multiplexes a signal with respect to the transmit antennas. In other words, the feedback processing for beforehand providing the antenna weighting coefficient matrix V is all omitted. The transmitter inserts, prior to sending the multiplexed signal, training signals to be used in channel estimation by the receiver, in the multiplexed signal. For instance, the training signals for respective antennas are inserted in the signal in a time division fashion. In the example of FIG. 7, the training signals are sent included in the data packet such that a training signal Training-1 corresponding to an antenna #1 is sent following a preamble signal and a training signal Training-2 corresponding to an antenna #2 is subsequently sent, in a time division fashion.

On the part of the receiver, a channel estimator thereof performs a channel estimation using the training signals, to calculate the channel information matrix H representing information on the sub-channels linking respective antenna pairs. A first antenna weighting coefficient matrix calculator performs zero-forcing or others for each of signals corresponding to the respective transmit antennas so as to cancel unnecessary signals, i.e., signals other than that for the respective receive antennas, and obtains a receive antenna weighting coefficient matrix $Z_R$. The transmitted signal having the highest S/N ratio among the signals retrieved after $Z_R$ is provided, is first decoded to obtain a signal $x_1$.

Next, the decoded signal is encoded again by an encoder to generate a replica (duplicate) of the transmitted signal $x_1$, which is canceled from the signals just received by the receive antennas. A second receive antenna weighting coefficient matrix calculator excludes the transmit antenna corresponding to the transmitted signal $x_1$ as canceled, and again applies zero-forcing criteria to each of the other signals, to calculate a receive antenna weighting coefficient matrix $Z_R'$. The signal $x_2$ exhibiting the highest S/N ratio among the remaining received signals is decoded by the decoder.

In the second decoding, since the transmitted signal as decoded first is eliminated, the degree of freedom of the receive antennas is enhanced and the effect of maximal ratio combining is accordingly improved. Thereafter, all transmitted signals as multiplexed are sequentially decoded by iteration of the above-described processing.

As described above, a characteristic of the V-BLAST resides in that zero-forcing and canceling are sophisticatedly combined so that even a signal whose S/N ratio can not be made sufficiently high only by application of zero-forcing criteria can be improved in S/N ratio by taking advantage of the degree of freedom of the antennas which is provided by the canceling, and thus the accuracy of the decoding is enhanced. Thus, the V-BLAST can realize an efficient MIMO transmission system by a combination of relatively simple mechanisms.

However, since the transmitter does not perform the weighting before the data transmission, the receiver is required to implement the first decoding only by zero-forcing, without performing the canceling operation. Thus, the number of receive antennas is made larger than that of the transmit antennas so as to obtain a redundancy in degree of freedom of the receive antennas. In the example shown in FIG. 7, two transmit antennas and three receive antennas are provided.

For instance, where a bidirectional MIMO transmission system where data transmission between the transmitter and the receiver in the uplink and downlink directions are enabled is desired, the V-BLAST system as described above requires a total of 3×3 antennas at least to realize such a system, as can be seen from FIG. 8. This is because three or more antennas are essential for the receiver to assure the decoding accuracy, and since the MIMO system is bidirectional, both sides of the link should have three antennas. In a wireless LAN, for example, it is more often than not the case that providing a station of a relatively small size (mobile station) with three antennas is difficult, since there can not be spared much power source and implementation capacity for the antennas, although an access point (control station) may be able to spare more of them.

SUMMARY OF THE INVENTION

A first object of the present invention to provide an excellent wireless communication system, wireless communication apparatus, wireless communication method and computer program, which realizes a broadband wireless transmission under a communication environment such as in a home.

A second object of the invention is to provide an excellent wireless communication system, wireless communication apparatus, wireless communication method and computer program, which can enhance the transmission capacity by implementing a communication (MIMO communication) using space division multiplexing between a transmitter and a receiver each having a plurality of antennas.

A third object of the invention is to provide an excellent wireless communication system, wireless communication apparatus, wireless communication method and computer program, which can suitably implement a MIMO communication using a singular value decomposition (SVD) of a channel information matrix whose elements respectively represent a gain on each sub-channel linking a pair of a transmitter and a receiver.

A fourth object of the invention is to provide an excellent wireless communication system, wireless communication apparatus, wireless communication method and computer program, which can reduce an amount of information fed back from a receiver to a transmitter in a SVD-MIMO transmission.

A fifth object of the invention is to provide an excellent wireless communication system, wireless communication apparatus, wireless communication method and computer program, which can simplify a set-up procedure including feedback of information from a receiver to a transmitter and assure a satisfactory decoding capability while requiring a reduced number of antennas, in a SVD-MIMO transmission.

The present invention has been developed in view of the above-described objects, and a first aspect thereof provides a wireless communication system for a communication between a transmitter and a receiver each having a plurality of antennas, by multiplexing a signal. The system comprises:

a channel information acquirer which obtains channel information representing a characteristic of a channel linking the transmitter and the receiver;

a first matrix determiner which determines a weighting coefficient matrix for the antennas of the transmitter based on the obtained channel information;

a weight calculator which calculates a weight to be assigned to each of components of the signal multiplexed at the transmitter;

a training signal sender which sends training signals for the respective components of the multiplexed signal to the receiver, the training signals being weighted by the weights calculated by the weight calculator; and a second matrix determiner which determines a weighting coefficient matrix for the antennas of the receiver based on the received training signals.

It is noted that the term "system" means a logical assembly of a plurality of apparatuses (or functional modules for realizing respective specific functions); the apparatuses or functional modules may or may not be enclosed in a single housing.

According to the first aspect of the present invention, an antenna weighting coefficient matrix V on the part of the transmitter as obtained by performing a singular value decomposition is not fed back to the transmitter, but the receiver sends the reference signals to the transmitter which performs a singular value decomposition to obtain an antenna weighting coefficient matrix V necessary when transmitting data. Thus, an amount of information fed back to the transmitter from the receiver can be reduced.

Also according to the first aspect of the present invention, even the amount of the information fed back is reduced, the transmitter sends data where the transmit antenna weighting coefficient matrix V is applied, the receiver can obtain a satisfactory decoding capability with a reduced number of antennas.

Where the channel information is estimated at the transmitter based on the reference signals sent from the receiver to the transmitter, relevant means for obtaining the channel information calibrates the channel information obtained based on the reference signals sent from the receiver to the transmitter so as to obtain channel information in the direction from the transmitter to receiver.

The channel information matrix H is a function of a transfer function related to the transmitter, a spatial construction (transfer function), and a transfer function related to the receiver. The spatial transfer function is reversible, and takes a same value whether the spatial transfer function is measured in the direction from the transmitter to the receiver or vice versa. On the other hand, each of transfer functions related to the transmitter and receiver shows fluctuation due to variation of an analogue circuitry for RF transmission/reception of the transmitter and receiver, with the reversibility unassured.

This irreversibility does not matter when the transmit antenna weighting coefficient matrix V obtained by the singular value decomposition of the channel information matrix as acquired by the receiver is fed back to the transmitter. However, where the antenna weighting coefficient matrix V' which is necessary for the transmitter to send the data is obtained such that the receiver sends the reference signals to the transmitter which then performs the singular value decomposition, the fluctuation due to the variation of analog circuitry of both the receiver and transmitter affects the calculation of the antenna weighting coefficient matrix V', and the two matrices V and V' do not coincide. Thus, the calibration is required.

Further, the transmitter can employ maximal ratio combining, zero-forcing for canceling all the unnecessary signals, the combination of these, or the singular value decomposition, in determining the transmit antenna weighting coefficient matrix. When the antenna weighting coefficient matrix is obtained by the transmitter using the singular value decomposition, the receiver need not perform a singular value decomposition.

Further, the receiver can apply zero-forcing criteria in canceling all unnecessary signals from each signal transmitted from the transmitter, in determining the receive antenna weighting coefficient matrix.

In the wireless communication system according to the first aspect of the invention, to assure the communication quality, the transmitter sends a transmission requesting packet RTS (Request To Send), and the receiver sends a confirmation packet CTS (Clear To Send) in response to the RTS, so that the data transfer is initiated when the transmitter receives the CTS. That is, the wireless communication system can employ the RTS/CTS function. In the case where the RTS/CTS function is employed, the receiver may send the CTS packet with the reference signals included therein. The transmitter obtains the channel information based on the reference signals included in the CTS packet and calibrates the channel information, so as to obtain the channel information indicative of the characteristic of the link in the direction from the transmitter to the receiver. The transmitter then calculates a weight for each of multiplexed signal components, and sends a data packet including the training signals accordingly weighted.

A second aspect of the invention provides a computer program for a computer system to perform processing for transmitting a signal from a transmitter to a receiver by multiplexing the signal using a plurality of antennas, the program comprising steps of:

obtaining channel information representing a characteristic of a channel linked to a receiver;

determining a weighting coefficient matrix for transmit antennas based on the obtained channel information;

calculating a weight to be assigned to each of components of the multiplexed signal; and sending training signals for the respective components of the multiplexed signal to the receiver, the training signals being weighted by the weights calculated in the calculating step.

The second aspect of the invention defines a computer program described in a computer-readable format according to which a computer system performs predetermined processing. In other words, by installing the computer program related to the second aspect of the invention in the computer system, a cooperative operation is performed in the computer system which operates as a wireless communication apparatus. By establishing a wireless network by activating a plurality of such wireless communication apparatuses, the same operation and effects as those of the first aspect of the invention can be obtained.

The invention can provide the excellent wireless communication system, wireless communication apparatus, wireless communication method and computer program, where the pair of the transmitter and receiver each having the plural antennas is capable of making a communication using space division multiplexing (MIMO communication) in which the transmission capacity is enhanced.

Further, the invention can provide the excellent wireless communication system, wireless communication apparatus, wireless communication method and computer program, which are capable of performing a MIMO transmission using the singular value decomposition (SVD) of the channel information matrix each of whose elements corresponds to the characteristic of each sub-channel linking each pair of a transmit antenna and a receive antenna.

The invention can also provide the excellent wireless communication system, wireless communication apparatus, wireless communication method and computer program, which are capable of reducing the amount of information fed back from the receiver to the transmitter in performing the SVD-MIMO transmission.

The invention can also provide the excellent wireless communication system, wireless communication apparatus, wireless communication method and computer program, which are capable of simplifying the set-up procedure including the feedback of information from the receiver to the transmitter in performing the SVD-MIMO transmission, and of obtaining a satisfactory decoding capability with a reduced number of antennas.

According to the invention, the feedback, to the transmitter, of the transmit antenna weighting coefficient matrix V obtained by the singular value decomposition of the channel information matrix acquired by the receiver is not implemented. Instead, the receiver sends the reference signals to the transmitter which performs the singular value decomposition to obtain the antenna weighting coefficient matrix V necessary when transmitting data of interest, so that the amount of information fed back to the transmitter from the receiver is reduced.

The further objects, features and advantages of the invention will be clarified by the more detailed illustration of the invention by the following description of embodiments of the invention and accompanying drawings.

DETAILED DESCRIPTION OF THE PREFERRED EMBODIMENTS

There will be described embodiments of the invention by reference to the drawings.

Figure 1:
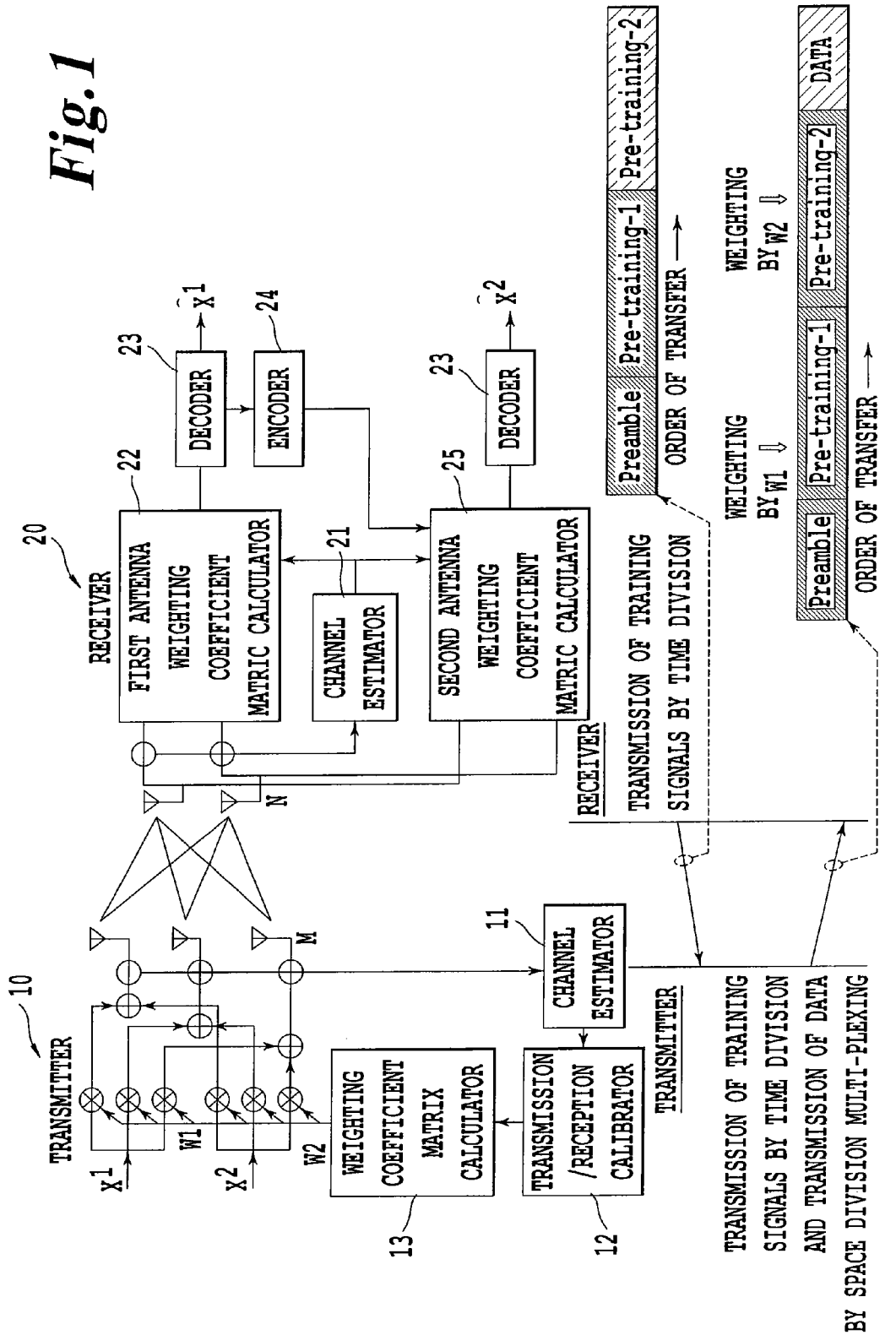
FIG. 1 schematically shows a construction of a MIMO communication system according to a first embodiment of the invention.

FIG. 1 schematically shows a construction of a first embodiment of the invention.

A transmitter space-time encodes each transmitted signal to multiplex the signal and distributes the multiplexed signal to three antennas to send the signal therefrom to a receiver over a channel. The receiver receives the multiplexed signal via the channel through two antennas and space-time decodes the signal to obtain received signal or data.

Figure 7:
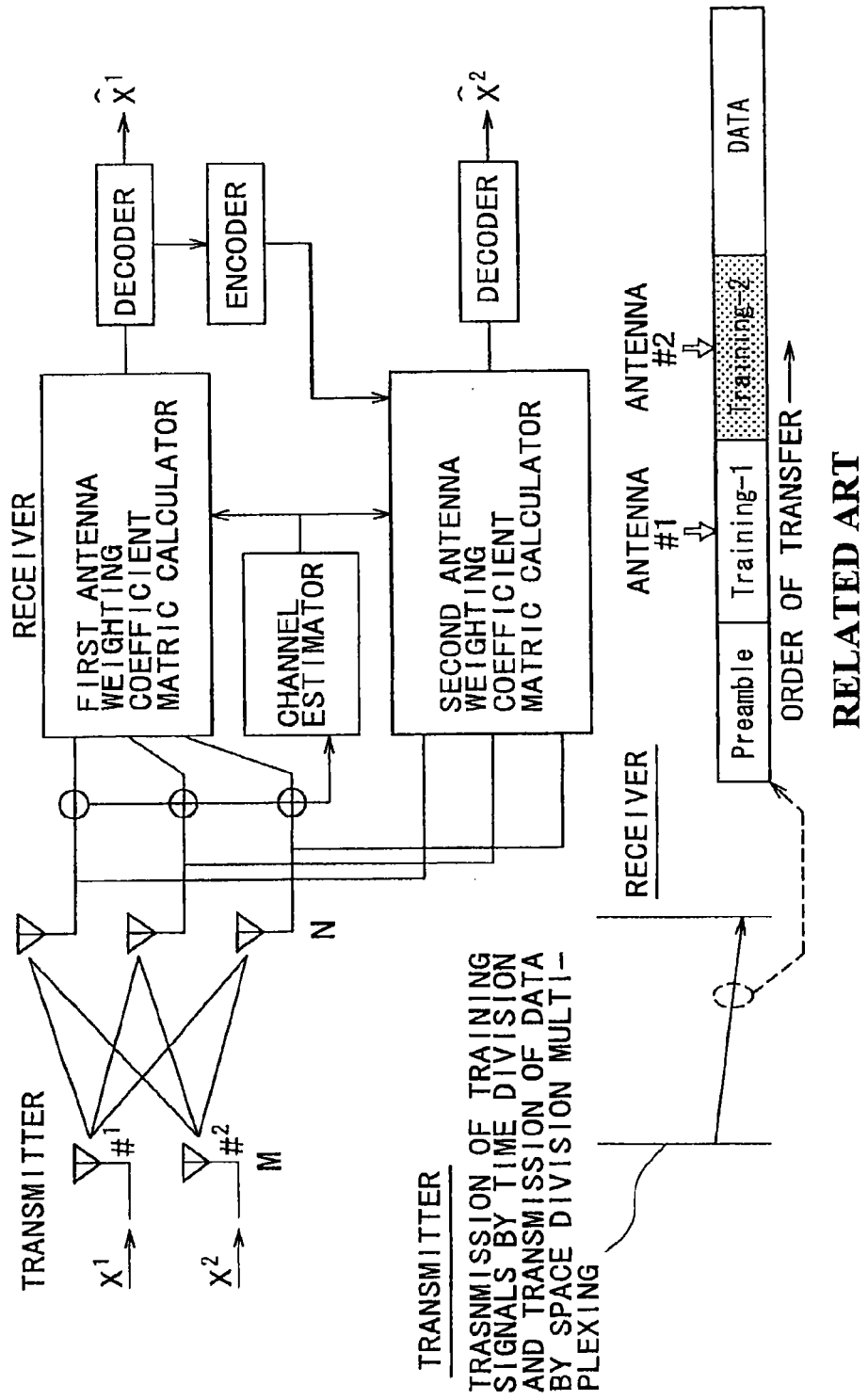
FIG. 7 illustrates a concept of V-BLAST communication system.
Figure 8:
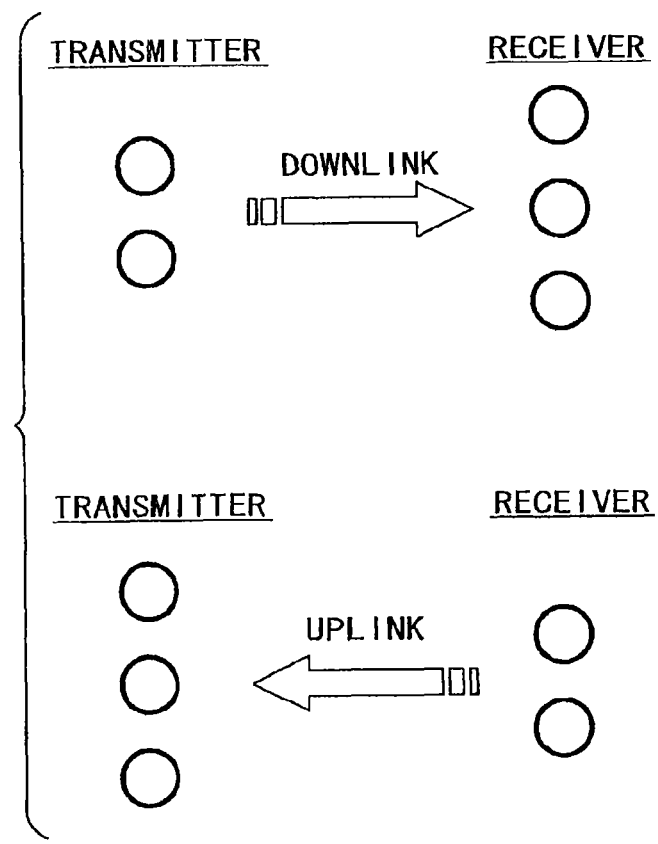
FIG. 8 shows an example of an antenna configuration of a transmitter and a receiver in a V-BLAST communication system.

The communication system shown resembles the V-BLAST system of FIG. 7 in general. However, the transmitter, not the receiver, provides an antenna weighting coefficient when transmitting the data, and the antenna configuration of the transmitter and receiver is such that the number of the transmit antennas is larger than that of the receive antennas. The number of the receive antennas corresponds to the number of signal sub-channels.

In the system shown in FIG. 1, the part of the transmitter has a redundancy in the degree of freedom of the antennas. To take advantage of this redundancy for improving the S/N ratio of the received signal, the transmitter sends a signal weighted by MSN (Maximum Signal-to-Noise ratio) which is criteria for maximizing the S/N ratio of signal of self, by zero-forcing, or by a combination of the MSN and zero-forcing. As a result, even where a redundancy in the degree of freedom of the antennas on the part of the receiver is not available (that is, the number of receive antennas is relatively small), the degree of freedom on the part of the transmitter can compensate this, to assure a satisfactory decoding capability.

The operational procedure in the present communication system will be described.

As a preparatory step, a training signal "Pre-training Signal" with respect to each antenna is sent from the receiver 20 in a time division fashion. In the specific example of FIG. 1, the receiver has two receive antennas, and therefore two Pre-training Signals are sent. A preamble "Preamble" prefixed to the "Pre-training Signal" is an additive signal for serving a signal detection, a timing synchronization and an adjustment of receiver gain.

The transmitter 10 receives the training signal from the receiver 20 as a reference signal, calculates the channel information matrix H by a channel estimator 11 of the transmitter 10, and determines a transmit antenna weighting coefficient matrix $Z_T$ by a transmit antenna weighting coefficient matrix calculator 13 by applying the MSN, zero-forcing, or combination of these, with respect to each antenna.

At this point, there may be a difference between the channel characteristics of transmitting and receiving circuitry of the transmitter 10. This is because of the following fact: Although the reversibility can be established in the spatial transfer function, the channel information matrix H is a function of a transfer function related to the transmitter 10, a spatial construction (transfer function), and a transfer function related to the receiver 20; the transfer functions related to the transmitter 10 and receiver 20 show fluctuation derived from variation of the analog circuitry for RF transmission/reception, and can not assure the reversibility. This irreversibility does not matter when the transmit antenna weighting coefficient matrix V obtained by the transmitter 10 by the singular value decomposition of the channel information matrix as acquired by the receiver 20 fed back to the transmitter 10 itself However, in the present embodiment where the antenna weighting coefficient matrix which is necessary for the transmitter to send the data is obtained by the transmitter 10 by sending the Pre-training Signals from the receiver 20 to the transmitter 10, the variation of analog circuitry of both the receiver and transmitter affects the calculation of the matrix $Z_T$. In this case, a transmission/reception calibrator 12 performs a suitable calibration on the matrix H.

Subsequently, the transmitter 10 sends a concatenation of training signals and a signal as a component of the signal indicative of the data of interest, which is obtained by multiplexing the signal by space division. The training signals are weighted for reflecting the characteristics of the respective corresponding antennas by using the matrix $Z_T$ obtained as described above. It is particularly noted that even in the period where the training signals are sent out, the weighting for reflecting the characteristics of the corresponding antennas (hereinafter referred to as "antenna-weighting") is performed for each signal multiplexed. In the example of FIG. 1, training signals Training-1 and Training-2, which are respectively subjected to weighting by element vectors $w_1$ and $w_2$ of the antenna weighting coefficient matrix $Z_T (=[w_1, w_2])$, are sent by time division.

On the other hand, a channel estimator 21 of the receiver 20 calculates a channel information matrix H' each element of which corresponds to a pair of one of the transmit weighting coefficient vectors and a corresponding receive antenna, based on the training signals Training-1 and -2 as weighted with respect to each of signal components sent in a multiplexed fashion.

A first receive antenna weighting coefficient matrix calculator 22 performs zero-forcing for each component of the transmit weighting coefficient vector to cancel the unnecessary signals other than a signal related to the receive antenna itself, so as to obtain a receive antenna weighting coefficient matrix $Z_R$. Among the signals retrieved after the matrix $Z_R$ is provided, the signal exhibiting the highest S/N ratio is first decoded by a decoder 23 into $x_1$.

Next, the encoder 24 encodes the signal as decoded once again to produce a replica (duplicate) of the transmitted signal, which is canceled from a signal just received by the antenna. A second receive antenna weighting coefficient matrix calculator 25 excludes the corresponding transmit weighting coefficient vector components from the transmitted signal subjected to the canceling, and performs again zero-forcing for the signal to calculate a receive antenna weighting coefficient matrix $Z_R'$. The signal $x_2$ exhibiting the highest S/N ratio among the remaining received signals is retrieved to be decoded by the decoder 23. In the second decoding operation, since the transmitted signal as first decoded is eliminated, the degree of freedom of the receive antennas is increased, accordingly enhancing the effect of maximal ratio combining. By iterating the above-described processing, all the multiplexed transmitted signals are decoded in sequence.

The first embodiment is such that the transmitter 10 performs transmission of signals by using the MSN, zero-forcing, or combination of these, in weighting the signals. Thus, the degree of freedom of the transmit antennas is fully exploited, enhancing the S/N ratio of the received signals. Hence, even where there is no redundancy in the degree of freedom of antennas on the part of the receiver 20, the redundancy of the degree of freedom on the part of the transmitter can compensate this.

Figure 2:
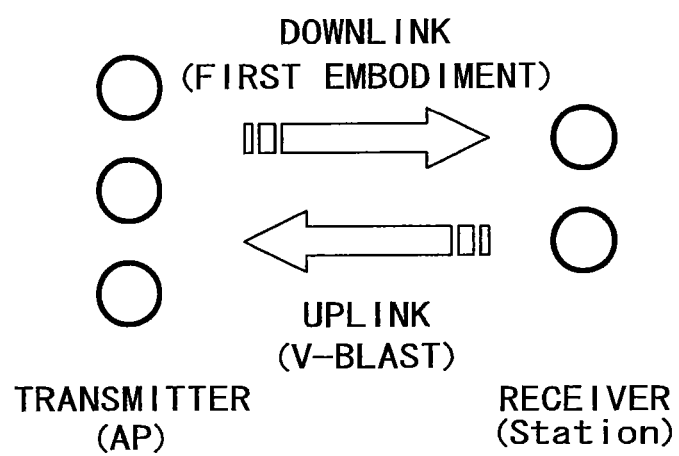
FIG. 2 shows an example of an antenna configuration of a transmitter and a receiver of the system.

FIG. 2 is a diagram specifically showing an antenna configuration in a bidirectional MIMO transmission system where a communication system related to the invention and a conventional communication system such as the V-BLAST are combined and where communication in the uplink and downlink directions is possible.

In the specific example of FIG. 2, the transmitter has three antennas, while the receiver has two antennas. Where a downlink communication, namely, a communication in the direction from the transmitter to the receiver, is performed, the first embodiment of the invention is applied. That is, the antenna configuration is such that the number of transmit antennas is larger than that of the receive antennas (which equals the number of signal sub-channels as multiplexed communication channel), there is no redundancy in the degree of freedom of the receive antennas (namely, the number of the receive antennas is relatively small), and the redundancy in the degree of freedom of the antennas on the transmitter part compensates for the low degree of freedom of the receive antennas, to assure a satisfactory decoding capability.

On the other hand, where a communication in the uplink direction, namely, a communication in the direction from the receiver to the transmitter is performed, a MIMO transmission can be initiated without any set-up procedure as in the V-BLAST system shown in FIG. 7. Since the V-BLAST method is not applied when the downlink communication is performed, the number of antennas need not be increase, to achieve the satisfactory decoding capability.

An efficient MIMO communication system can be designed, for instance, by arranging such that three antennas (or redundant degree of freedom of antennas) are provided to an access point (control station) which has relatively ample power source and implementation capacity, while two antennas (or non-redundant degree of freedom of the antennas) are provided to a station (mobile station) relatively small in size and having less power source and implementation capacity than an access point.

Further, to assure the communication quality, the present communication system employs the RTS/CTS function where the transmitter sends a transmission requesting packet RTS (Request To Send), and the receiver sends a confirmation packet CTS (Clear To Send) in response to the RTS, so that the transmitter initiates data transfer upon receiving the CTS.

Figure 3:
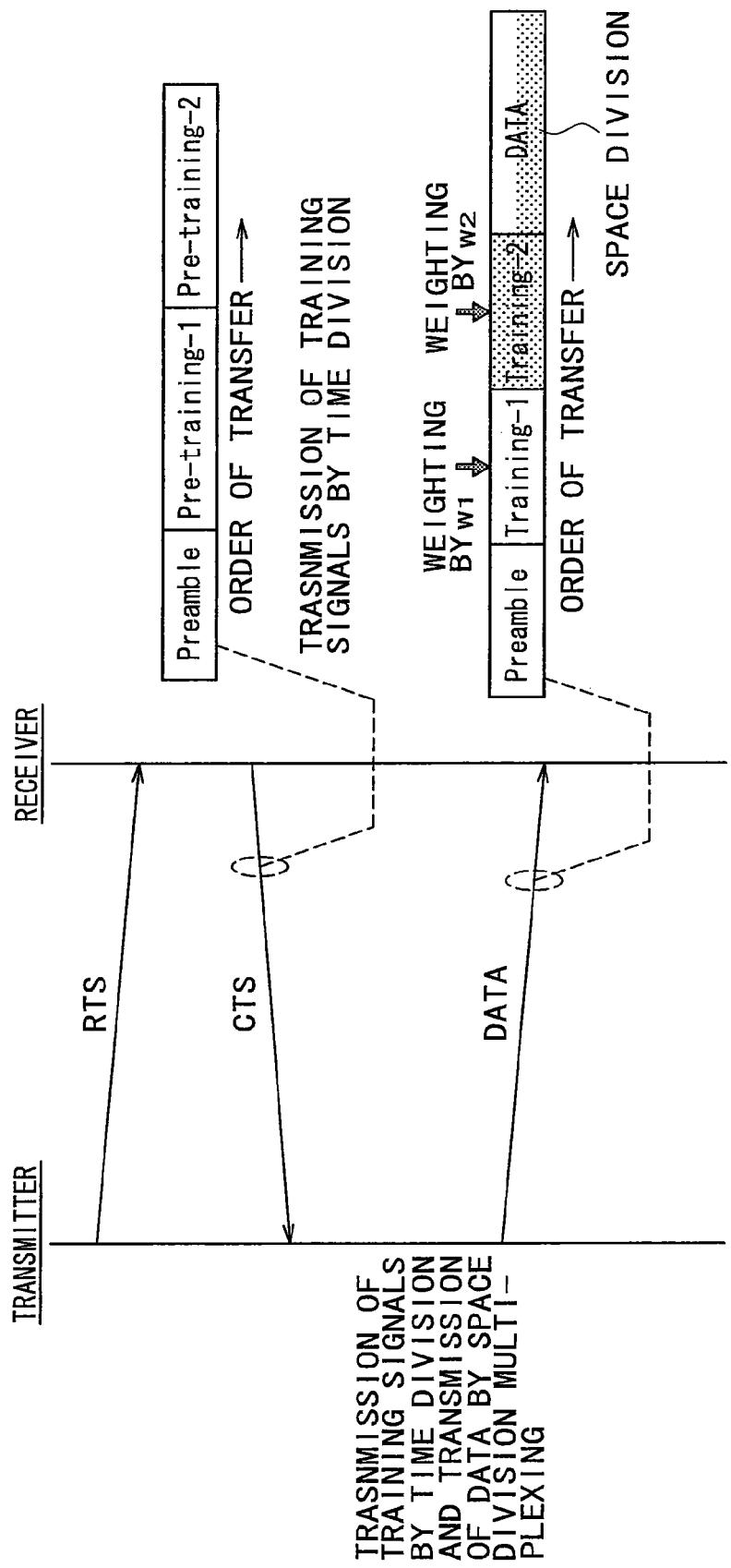
FIG. 3 shows an operational sequence between the transmitter and receiver of the system where an RTS/CTS function is employed.

FIG. 3 shows a transmission/reception operational sequence in the communication system where the RTS/CTS system is applied.

As shown in FIG. 3, the receiver, once receiving the RTS, sends the CTS packet with the reference signals included therein in response to the RTS. The transmitter, once receiving the CTS packet, calibrates the channel information obtained based on the reference signals included in the CTS packet, so as to obtain the channel information in the direction from the transmitter to receiver to calculate the weight for each of signal component multiplexed, and sends data packet including the training signals for respective signal components sent in a multiplexed fashion. The data part of the data packet is sent as a signal multiplexed by space division multiplexing.

Figure 4:
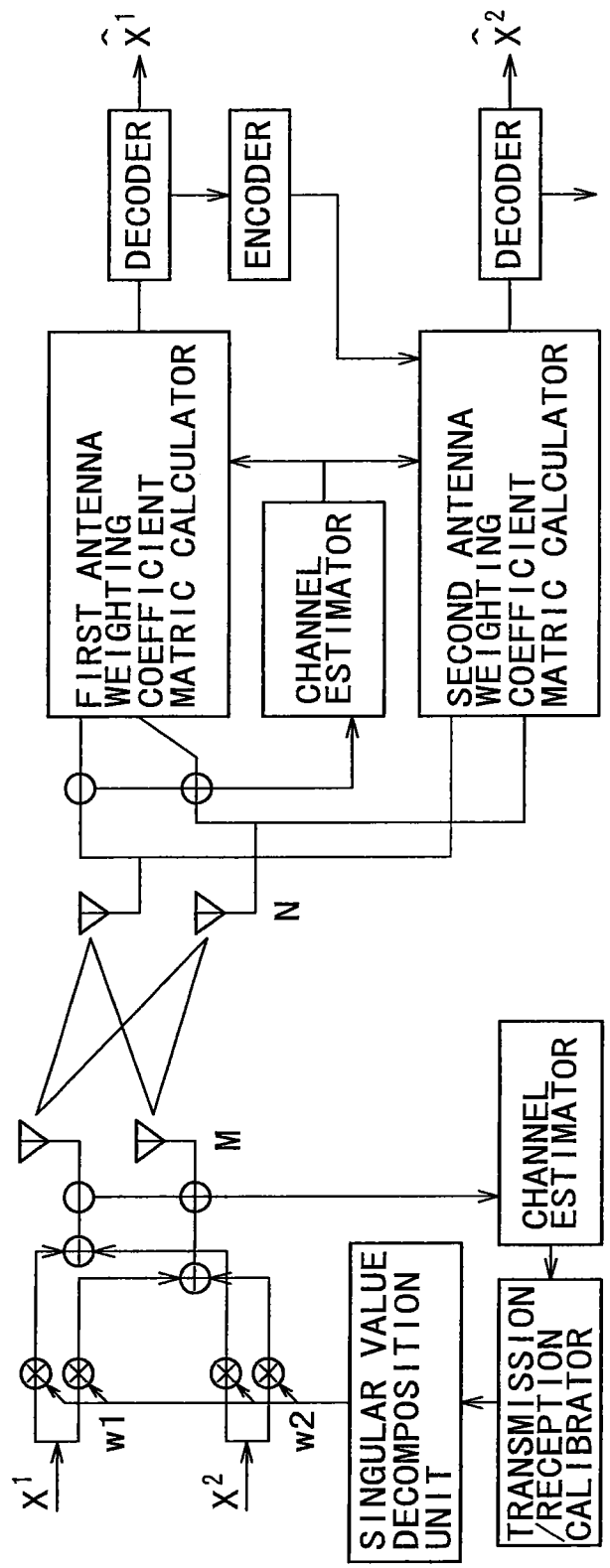
FIG. 4 schematically shows a construction of a communication system according to a second embodiment of the invention.
Figure 5:
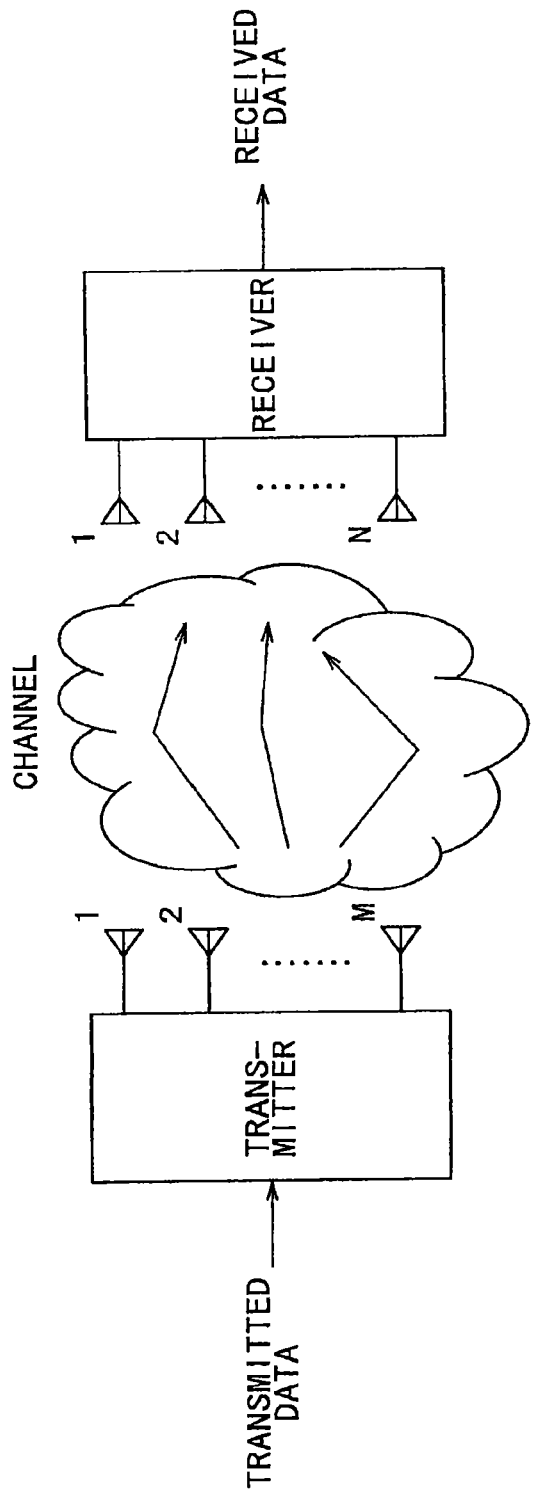
FIG. 5 illustrates a concept of MIMO communication system.
Figure 6:
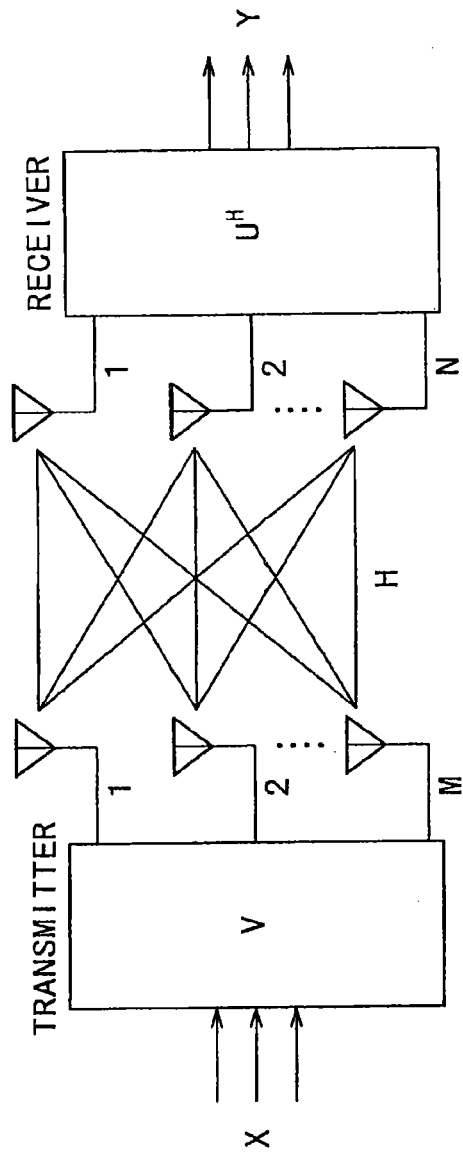
FIG. 6 illustrates a concept of SVD-MIMO transmission system.

FIG. 4 is a diagram illustrating a construction of a communication system according to a second embodiment of the invention.

The system of FIG. 4 is identical with the system of FIG. 1 in that each transmitted signal multiplexed on the part of the transmitter is space-time decoded to be distributed to plural antennas through which the signal components are sent to the receiver over respective sub-channels of a channel in a multiplexed fashion, and the receiver space-time decodes the signal components received through plural antennas via the sub-channels to obtain a received signal or data.

In the embodiment of FIG. 1, the transmit antenna weighting coefficient matrix calculator 13 determines, for each antenna, the transmit antenna weighting coefficient matrix $Z_T$ by the MSN, zero-forcing, or combination of these, based on the channel information matrix H obtained by a calculation using the training signals from the receiver 20. On the other hand, the second embodiment is such that a singular value decomposition unit 15 employs the SVD (Singular Value Decomposition) in calculating the transmit antenna weighting coefficient, and weights the signal by the weighting coefficient matrix V before transmission of the signal.

When zero-forcing criteria is applied to the training signals sent with weighted by V, the weighting coefficient matrix on the part of the receiver 20 necessarily becomes $U^H$. Therefore, it is obvious that if the SVD calculation on the part of the transmitter 10 is allowed, a SVD-MIMO transmission without communication of $U^H$ to the receiver 20 is enabled, omitting the necessity to perform the singular value decomposition on the part of the receiver 20. That is, according to the present embodiment, a MIMO system with 2×2 antennas can be relatively easily realized.

It is noted that there may be some cases where the channel characteristic of the transmitting circuitry and that of the receiving circuitry of the transmitter 10 are different; in this case, the transmission/reception calibrator suitably calibrates the channel information matrix H, as described above.

On the part of the receiver 20, the channel estimator 21 calculates a channel information matrix H' each element of which corresponds to a pair of one of the transmit weighting coefficient vectors and a corresponding receive antenna. The first receive antenna weighting coefficient matrix calculator 22 performs zero-forcing for each component of a transmit weighting coefficient vector to cancel unnecessary signals other than the signal related to the receiver itself, to obtain a receive antenna weighting coefficient matrix $U^H$. The signal exhibiting the highest S/N ratio among the received signals retrieved after $U^H$ is provided is decoded by a decoder 23 to obtain signal $x_1$.

Thereafter, the decoded signal is again encoded by an encoder 24, to produce a replica (duplicate) of the transmitted signal which is canceled from a received signal just received by the antenna. A second receive antenna weighting coefficient matrix calculator 25 excludes components of transmit weighting coefficient vector corresponding to the transmitted signal subjected to the canceling, and again applies zero-forcing to the signal to calculate a receive antenna weighting coefficient matrix $U^H$. The signal $x_2$ exhibiting the highest S/N ratio among the remaining received signals is retrieved and decoded by the decoder 23. Or alternatively, the second multiplexed signal $x_2$ may be directly retrieved from each received signal retrieved after the first receive antenna weighting coefficient matrix calculator 22 has provided $U^H$.

Although the invention has been described in detail by reference to specific embodiments thereof, it is to be understood that modifications of the embodiments or substitution of some elements or features in the embodiments which may occur to those skilled in the art may be made, without departing from the gist of the invention. That is, the embodiments have been described for illustrative purposes only, and the invention is not limited to the details of the embodiments. In interpreting the gist of the invention, appended claims should be well taken into consideration.

What is claimed is:

1. A wireless communication apparatus for transmitting a signal by multiplexing the signal using a plurality of antennas, the apparatus comprising:
   circuitry configured to:
      acquire feedback information corresponding to a characteristic of a channel linking the apparatus to a receiver;
      determine a weighting coefficient matrix for each of the plurality of antennas based on the acquired feedback information; and
      control transmission of training signals to the receiver, the training signals being weighted by weights included in the weighting coefficient matrix and intended for channel estimation at the receiver, wherein the number of training signals is determined according to the number of antennas.

2. The wireless communication apparatus of claim 1, wherein the training signals are used for channel estimation at the receiver.

3. The wireless communication apparatus of claim 1, wherein
   the circuitry is configured to calculate weights included in the weighting coefficient matrix.

4. The wireless communication apparatus of claim 1, wherein
   the circuitry is configured to calculate a weight to be assigned to each component of the signal multiplexed at the transmitter.

5. The wireless communication apparatus of claim 1, wherein the training signals are compensated by using a calibration coefficient.

6. The wireless communication apparatus of claim 1, wherein the number of training signals is equal to the number of antennas.

7. The wireless communication apparatus of claim 1, wherein the feedback information is compressed.

8. The wireless communication apparatus of claim 1, wherein the feedback information is channel information.

9. The wireless communication apparatus of claim 1, wherein the training signals each include a consecutive sequence of bits.

10. The wireless communication apparatus of claim 1, wherein the training signals for each of the respective antennas include a different consecutive sequence of bits.

* * * * *